(12) United States Patent
Wang

(10) Patent No.: US 11,988,848 B2
(45) Date of Patent: May 21, 2024

(54) OPTICAL ANTI-SHAKE RESILIENT SUPPORT MECHANISM, ANTI-SHAKE DRIVING DEVICE, LENS DRIVING FITTING, IMAGING EQUIPMENT AND ELECTRONIC APPARATUS

(71) Applicant: NEW SHICOH MOTOR CO., LTD., Jiaxing (CN)

(72) Inventor: Zaiwei Wang, Jiaxing (CN)

(73) Assignee: NEW SHICOH MOTOR CO., LTD., Jiaxing (CN)

( * ) Notice: Subject to any disclaimer, the term of this patent is extended or adjusted under 35 U.S.C. 154(b) by 190 days.

(21) Appl. No.: 17/721,792

(22) Filed: Apr. 15, 2022

(65) Prior Publication Data

US 2022/0350160 A1    Nov. 3, 2022

Related U.S. Application Data

(63) Continuation of application No. PCT/CN2022/078914, filed on Mar. 3, 2022.

(30) Foreign Application Priority Data

Apr. 28, 2021  (CN) .................. 202110470286.X

(51) Int. Cl.
    *G02B 27/64*  (2006.01)
    *H04N 23/55*  (2023.01)
(52) U.S. Cl.
    CPC ........... *G02B 27/646* (2013.01); *H04N 23/55* (2023.01)

(58) Field of Classification Search
    None
    See application file for complete search history.

(56) References Cited

U.S. PATENT DOCUMENTS

| 9,785,038 B2 * | 10/2017 | Wu ..................... G02B 27/646 |
| 2007/0014555 A1 * | 1/2007 | Hirunuma ................ G03B 5/00 |
| | | 348/E5.046 |
| 2022/0353415 A1 * | 11/2022 | Wang ................... H04N 23/682 |

* cited by examiner

*Primary Examiner* — Rodney E Fuller
(74) *Attorney, Agent, or Firm* — Zhigang Ma

(57) ABSTRACT

An optical anti-shake resilient support mechanism, an anti-shake driving device, a lens driving fitting, an imaging equipment and an electronic apparatus are provided. The optical anti-shake resilient support mechanism includes two X-direction resilient sheets symmetrically distributed with an optical axis of an optical component as an axis of symmetry and used to connect a focusing motor assembly and an optical anti-shake frame or to connect a base and the optical anti-shake frame; and two Y-direction resilient sheets symmetrically distributed with the optical axis of the optical component as an axis of symmetry and used to connect the base and the optical anti-shake frame or to connect the focusing motor assembly and the optical anti-shake frame. The unidirectional translation is one of X-axis unidirectional translation and Y-axis unidirectional translation, unidirectional performance is better than that of other optical anti-shake mechanisms, which can greatly simplify production process and reduce cost.

10 Claims, 6 Drawing Sheets

OPTICAL ANTI-SHAKE RESILIENT SUPPORT MECHANISM, ANTI-SHAKE DRIVING DEVICE, LENS DRIVING FITTING, IMAGING EQUIPMENT AND ELECTRONIC APPARATUS

FIELD OF THE DISCLOSURE

The disclosure relates to the field of optical component driving technologies, and more particularly to an optical anti-shake resilient support mechanism, an anti-shake driving device, a lens driving fitting, an imaging equipment and an electronic apparatus.

BACKGROUND OF THE DISCLOSURE

In order to improve quality of high-pixel images when taking pictures, cameras have to prevent hand shaking while focusing, so the optical anti-shake mechanism is widely used in advanced cameras. The optical anti-shake mechanism of micro camera in mobile phone has also become popular.

The existing anti-shake mechanism uses two L-shaped diagonal resilient sheets for anti-shake in X direction and Y direction. The simultaneous anti-shake of the X-axis and Y-axis is easy to affect each other, and the anti-shake compensation has poor anti-shake performance. In addition, the production process is complicated and the cost is high.

SUMMARY OF THE DISCLOSURE

An objective of the disclosure is to provide an optical anti-shake resilient support mechanism, an anti-shake driving device, a lens driving fitting, an imaging equipment and an electronic apparatus, which can solve the above technical problems.

In order to achieve the above objective, the disclosure adopts technical solutions as follows.

In an aspect, an optical anti-shake resilient support mechanism is provided. The optical anti-shake resilient support mechanism is configured to resiliently support on a focusing motor assembly and a base and resiliently support on the focusing motor assembly and an optical anti-shake frame.

Specifically, the optical anti-shake resilient support mechanism includes:

two X-direction resilient sheets, symmetrically distributed with an optical axis of an optical component as an axis of symmetry and configured to connect the focusing motor assembly and the optical anti-shake frame, or to connect the base and the optical anti-shake frame; and two Y-direction resilient sheets, symmetrically distributed with the optical axis of the optical component as an axis of symmetry and configured to connect the base and the optical anti-shake frame, or to connect the focusing motor assembly and the optical anti-shake frame.

When the two X-direction resilient sheets are configured to connect the focusing motor assembly and the optical anti-shake frame, the two Y-direction resilient sheets are configured to connect the base and the optical anti-shake frame.

When the two X-direction resilient sheets are configured to connect the base and the optical anti-shake frame, the two Y-direction resilient sheets are configured to connect the focusing motor assembly and the optical anti-shake frame.

The focusing motor assembly is driven by an X-axis driving assembly to translate unidirectionally along an X-axis in a horizontal plane perpendicular to the optical axis; or the focusing motor assembly is driven by a Y-axis driving assembly to translate unidirectionally along a Y-axis in a horizontal plane perpendicular to the optical axis.

In the above optical anti-shake resilient support mechanism, a structure of each of the two X-direction resilient sheets is the same as that of each of the two Y-direction resilient sheets, the structure includes a middle-fixing part, two end-fixing parts and two connecting parts. Two ends of the middle-fixing part are respectively connected to the two connecting parts, an end of each of the two connecting parts far away from the middle-fixing part is connected to one of the two end-fixing parts.

In an embodiment, the two end-fixing parts of each of the two X-direction resilient sheets are fixed on the optical anti-shake frame, and the middle-fixing part of each of the two X-direction resilient sheets is fixed on the focusing motor assembly; the two end-fixing parts of each of the two Y-direction resilient sheets are fixed on the base, and the middle-fixing part of each of the two Y-direction resilient sheets is fixed on the optical anti-shake frame.

In an embodiment, the two end-fixing parts of each of the two X-direction resilient sheets are fixed on the base, and the middle-fixing part of each of the two X-direction resilient sheets is fixed on the optical anti-shake frame; the two end-fixing parts of each of the two Y-direction resilient sheets are respectively fixed on the optical anti-shake frame, and the middle-fixing part of each of the two Y-direction resilient sheets is fixed on the focusing motor assembly.

In an embodiment, four corners of the base are respectively disposed with first fixing parts, and two of the first fixing parts as a group. The two end-fixing parts of each of the two X-direction resilient sheets are respectively fixed on the two first fixing parts of a same group; or the two end-fixing parts of each of the two Y-direction resilient sheets are respectively fixed on the two first fixing parts of a same group.

In an embodiment, four corners of the optical anti-shake frame are respectively disposed with second fixing parts, and two of the second fixing parts as a group. The two end-fixing parts of each of the two X-direction resilient sheets are respectively fixed on the two second fixing parts of a same group; or the two end-fixing parts of each of the two Y-direction resilient sheets are respectively fixed on the two second fixing parts of a same group.

In an embodiment, middles of two opposite sides of an outer frame of the focusing motor assembly are respectively connected to two third fixing parts, and middles of two opposite sides of the optical anti-shake frame are respectively connected to two fourth fixing parts, the two third fixing parts and the two fourth fixing parts are respectively distributed on four ends of a criss-cross. The middle-fixing parts of the two X-direction resilient sheets are respectively fixed on the two third fixing parts and the middle-fixing parts of the two Y-direction resilient sheets are respectively fixed on the two fourth fixing parts; or the middle-fixing parts of the two X-direction resilient sheets are respectively fixed on the two fourth fixing parts and the middle-fixing parts of the two Y-direction resilient sheets are respectively fixed on the two third fixing parts.

In an embodiment, the two X-direction resilient sheets and the two Y-direction resilient sheets are respectively located at lower inner sides of circumferential sides of the optical anti-shake frame, the circumferential sides of the optical anti-shake frame are respectively disposed with avoidance grooves for avoiding the connecting parts of the two X-direction resilient sheets and the connecting parts of the two Y-direction resilient sheets, and the connecting parts of the two X-direction resilient sheets and the two Y-direction resilient sheets are respectively located in the avoidance grooves.

In a second aspect, an optical anti-shake driving device is provided. The optical anti-shake driving device includes a focusing motor assembly, a base, an optical anti-shake frame, the above-mentioned optical anti-shake resilient support mechanism, and a driving assembly. The configured to support an optical component. The base is configured to support the focusing motor assembly. The optical anti-shake frame is configured to connect the focusing motor assembly and the base. The optical anti-shake resilient support mechanism is configured to make the focusing motor assembly suspend on the base. The driving assembly includes the X-axis driving assembly and the Y-axis driving assembly. The X-axis driving assembly is configured to drive the focusing motor assembly to translate unidirectionally along the X-axis in the horizontal plane perpendicular to the optical axis. The Y-axis driving assembly is configured to drive the focusing motor assembly to translate unidirectionally along the Y-axis in the horizontal plane perpendicular to the optical axis In an embodiment, the X-axis driving assembly includes two X-axis driving coils fixed on the base, and two opposite sides at a lower end of an outer frame of the focusing motor assembly are respectively disposed with X-axis driving magnets corresponding to the two X-axis driving coils one by one.

In an embodiment, the Y-axis driving assembly includes two Y-axis coils fixed on the base, and the other two opposite sides at the lower end of the outer frame of the focusing motor assembly are respectively disposed with Y-axis driving magnets corresponding to the two Y-axis driving coils one by one.

In an embodiment, each of the X-axis driving magnets is one of a single magnet and a double magnet, and each of the Y-axis driving magnets is one of a single magnet and a double magnet.

In an embodiment, the optical anti-shake frame is sleeved outside an upper end of the outer frame of the focusing motor assembly, and a gap is formed between the optical anti-shake frame and the outer frame.

In a third aspect, the disclosure provides a lens driving fitting with the optical anti-shake driving device.

Compared with the prior art, the beneficial effects of the disclosure are as follows:

the unidirectional translation is one of X-axis unidirectional translation and Y-axis unidirectional translation, that is, through the X-Y resilient sheets suspended by the optical anti-shake frame, the unidirectional performance better than other optical anti-shake mechanisms can be obtained, and the production process can be greatly simplified and the cost can be reduced.

The translational movement of the optical component perpendicular to the optical axis is realized, the optical component is disposed on the focusing motor assembly, and the driving assembly drives the focusing motor assembly to realize the translational movement perpendicular to the optical axis, so as to achieve the optical anti-shake purpose of the translational movement of the optical component.

The X-direction resilient sheets and the Y-direction resilient sheets are suspended on the optical anti-shaking frame respectively. When the focusing motor assembly moves in the X direction, only the X-direction resilient sheets act the opposite force, and the Y-direction resilient sheets act zero, the high-precision movement in the X direction is ensured. Similarly, the Y direction can also realize high-precision movement, and the focusing motor assembly can realize high-precision movement in X-Y composite.

Figure 1:
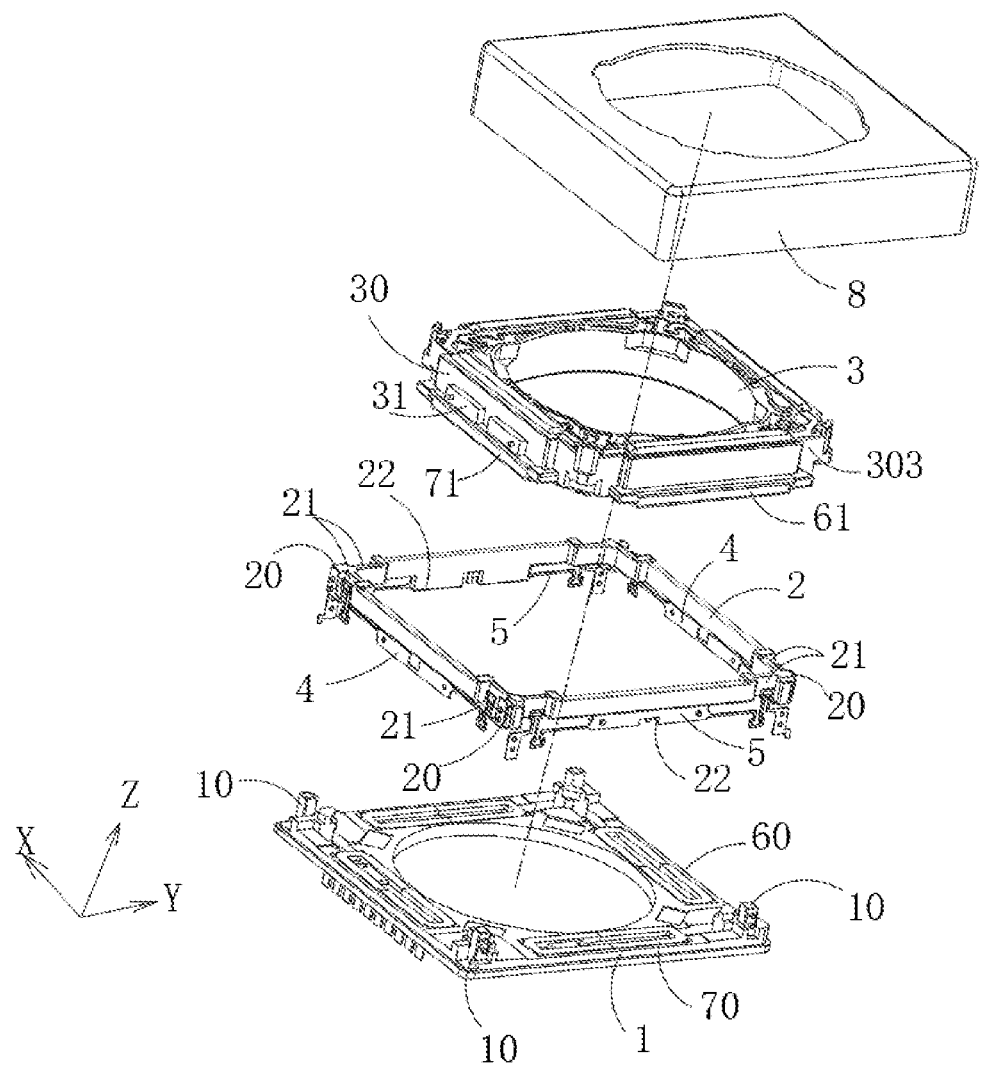
FIG. 1 is a schematic structural diagram from an exploded view of an optical anti-shake driving device provided by the disclosure.

Description of reference numerals: base 1, first fixing part 10, optical anti-shake frame 2, second fixing part 20, avoidance groove 21, fourth fixing part 22, focusing motor assembly 3, outer frame 30, magnet positioning groove 300, outer convex part 301, positioning groove body 302, avoidance notch 303, third fixing part 31, X-direction resilient sheet 4, middle-fixing part 40, transverse part 400, inverted T-shaped part 401, inverted T-shaped resilient space 402, T-shaped part 403, T-shaped resilient space 404, end-fixing part 41, connecting part 42, Y-direction resilient sheet 5, X-axis driving assembly 6, X-axis driving coil 60, X-axis driving magnet 61, Y-axis driving assembly 7, Y-axis driving coil 70, Y-axis driving magnet 71, housing 8, optical component a, and optical axis a1.

DETAILED DESCRIPTION OF EMBODIMENTS

The following are specific embodiments of the disclosure and further describe the technical solutions of the disclosure in combination with the accompanying drawings, but the disclosure is not limited to these embodiments.

Taking three axes of coordinates in the accompanying drawings as an example, one of the three axes distributed along the optical axis is a Z axis, a first direction perpendicular to the Z axis is an X axis, and a second direction perpendicular to the Z axis is a Y axis, and the X is vertically connected to Y axes in a horizontal plane.

Embodiment 1

As shown in FIG. 1, a base 1 is configured to support a focusing motor assembly 3. In order to improve anti-shake compensation performance, an optical anti-shake frame 2 is designed in this embodiment. A resilient support is designed between the base 1 and the optical anti-shake frame 2 and between the focusing motor assembly 3 and the optical anti-shake frame 2 to achieve a purpose of anti-shake.

Figure 8:
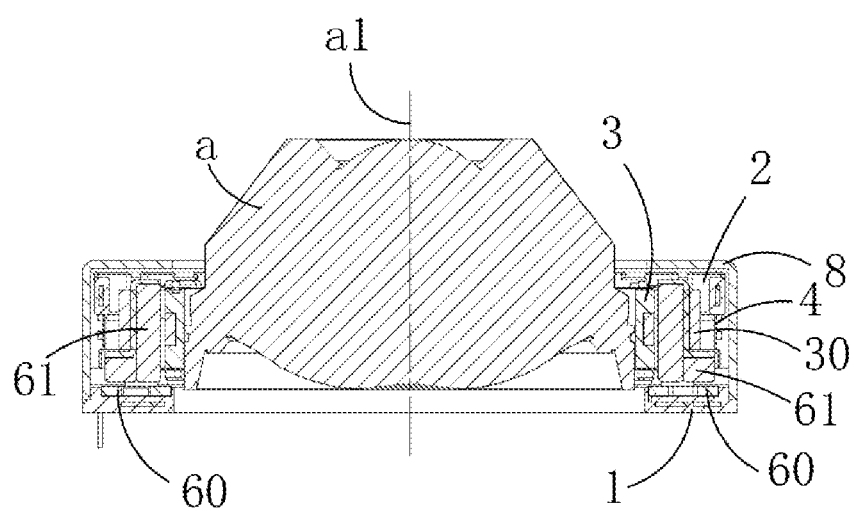
FIG. 8 is a cross-sectional structural diagram along line B-B in FIG. 7.

That is, as shown in FIGS. 1 and 8, an optical anti-shake resilient support mechanism of the disclosure is configured to resiliently support on the focusing motor assembly 3 and the base 1 and resiliently support on the focusing motor assembly 3 and the optical anti-shake frame 2.

Specifically, the optical anti-shake resilient support mechanism of the embodiment includes two X-direction resilient sheets 4 and two Y-direction resilient sheets 5.

The two X-direction resilient sheets 4 are symmetrically distributed with an optical axis a1 of an optical component a as an axis of symmetry and are configured to connect the focusing motor assembly 3 and the optical anti-shake frame 2.

The two X-direction resilient sheets 4 are vertically distributed along the optical axis a1, and the two X-direction resilient sheet 4 are parallel to the optical axis a1.

The two X-direction resilient sheets 4 distributed opposite to each other are located at a same horizontal height to ensure symmetrical distribution.

The two Y-direction resilient sheets 5 are symmetrically distributed with the optical axis a1 of the optical component a as an axis of symmetry and are configured to connect the base 1 and the optical anti-shake frame 2.

The Y-direction resilient sheets 5 are vertically distributed along the optical axis a1, and the Y-direction resilient sheets 5 are parallel to the optical axis a1.

The two Y-direction resilient sheets 5 distributed opposite to each other are located at a same horizontal height to ensure symmetrical distribution.

The two X-direction resilient sheets 4 and the two Y-direction resilient sheets 5 are distributed in a circle.

When two X-direction resilient sheets 4 are configured to connect the focusing motor assembly 3 and the optical anti-shake frame 2, the two Y-direction resilient sheets 5 are configured to connect the base 1 and the optical anti-shake frame 2, to make the focusing motor assembly 3 translate unidirectionally along the X-axis in a horizontal plane perpendicular to the optical axis a1 when driven in the X-axis; or to make the focus motor assembly 3 translate unidirectionally along the Y-axis in a horizontal plane perpendicular to the optical axis a1 when driven in the Y-axis.

The unidirectional translation is one of X-axis unidirectional translation and Y-axis unidirectional translation, that is, through the X-Y resilient sheets suspended on the optical anti-shake frame, the unidirectional performance is better than that of other optical anti-shake mechanisms, which can greatly simplify the production process and reduce the cost.

In an embodiment, the translation movement of the optical component (such as lens) perpendicular to the optical axis is realized. The optical component is disposed on the focusing motor assembly, and an X-axis driving assembly 6 and a Y-axis driving assembly 7 are configured to drive the focusing motor assembly to realize the translation movement perpendicular to the optical axis, so as to achieve the optical anti-shake purpose of the translation movement of the optical component.

The X-direction resilient sheets and the Y-direction resilient sheets are suspended on the optical anti-shaking frame respectively. When the focusing motor assembly moves in the X direction, only the X-direction resilient sheets act the opposite force, and the Y-direction resilient sheets act zero force, ensuring high-precision movement in the X direction. Similarly, the Y direction can also achieve high-precision movement. The high-precision movement of the focusing motor assembly in X-Y composite is realized in this way.

The adjacent X-direction resilient sheet 4 and Y-direction resilient sheet 5 are vertically distributed.

Figure 2:
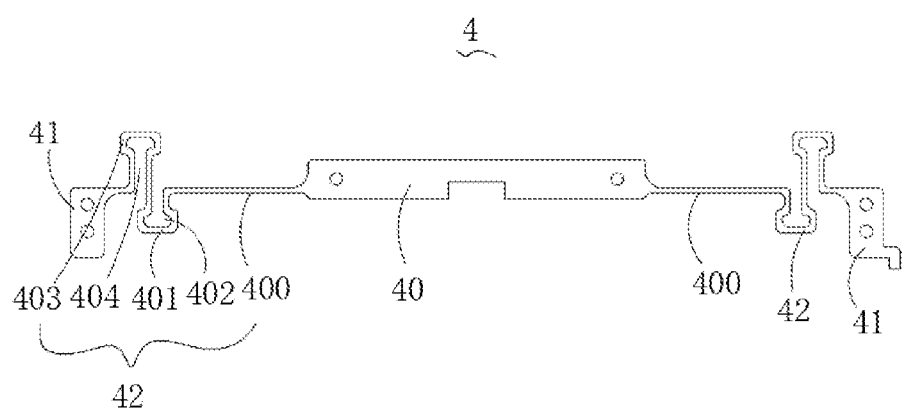
FIG. 2 is a schematic structural diagram of an X-direction resilient sheet provided by the disclosure.
Figure 3:
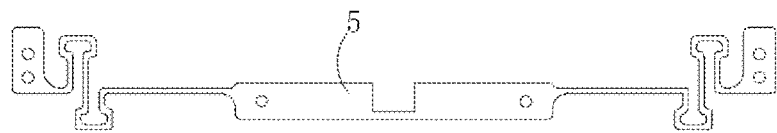
FIG. 3 is a schematic structural diagram of a Y-direction resilient sheet provided by the disclosure.

Specifically, as shown in FIGS. 1-3, a structure of each of two X-direction resilient sheets 4 is the same as that of each of the two Y-direction resilient sheets 5, and the structure includes a middle-fixing part 40, two end-fixing parts 41, and two connecting parts 42. Two ends of the middle-fixing part 40 are respectively connected to the two connecting parts 42, and one end of each of the two connecting part 42 far away from the middle-fixing part 40 is connected to one of the two end-fixing part 41.

A width of the middle-fixing part 40 is greater than that of the connecting part 42, the width of the end-fixing part 41 is also greater than that of the connecting part 42. The width of the middle-fixing part 40 and the width of the connecting part 42 tend to be equal, or the width of the middle-fixing part 40 is greater than that of the connecting part 42, so as to ensure the fixation firmness and stability of the two X-direction resilient sheets 4 and two Y-direction resilient sheets 5.

In an embodiment, the connecting part 42 of the embodiment includes a transverse part 400 connected to the middle-fixing part 40 and an inverted T-shaped part 401 connected to an end of the transverse part 400 far away from the middle-fixing part 40. The inverted T-shaped part 401 has an inverted T-shaped resilient space 402, an opening of the inverted T-shaped resilient space 402 faces downward, and a T-shaped part 403 is connected at the end of the inverted T-shaped part 401 far away from the transverse part 400. The T-shaped part 403 has a T-shaped resilient space 404, an opening of the T-shaped resilient space 404 faces upward, the T-shaped part 403 and the inverted T-shaped resilient space 402 are staggered up and down, and an end of the T-shaped part 403 away from the inverted T-shaped resilient space 402 is connected to the corresponding end-fixing part 41. The resilient translation and support function in the Y direction or X direction is realized by using the connecting parts, so as to realize anti-shaking function.

In an embodiment, the two end-fixing parts 41 of the X-direction resilient sheet 4 face the T-shaped part 403 side, while the two end-fixing parts 41 of the Y-direction resilient sheet 5 face the inverted T-shaped part 401 side to meet installation requirements.

In this embodiment, the two end-fixing parts 41 of each X-direction resilient sheet 4 are respectively fixed on the optical anti-shake frame 2, and the middle-fixing part 40 of each X-direction resilient sheet 4 is fixed on the focusing motor assembly 3. The two end-fixing parts 41 of each Y-direction resilient sheet 5 are respectively fixed on the base 1, and the middle-fixing part 40 of each Y-direction resilient sheet 5 is fixed on the optical anti-shake frame 2.

Using the fixed connection of the middle-fixing part, end-fixing parts and the connecting parts at the same time, it can ensure the stability of the unidirectional translation of the optical component in the X direction or Y direction. Take the X-axis unidirectional translation as an example: when the two X-direction resilient sheets in the X direction are driven by the X axis, because they are oppositely distributed, it can ensure the translation of the focusing motor assembly 3 carrying the optical component in the x-axis perpendicular to the optical axis.

Specifically, as shown in FIG. 1, four corners of the base 1 are respectively disposed with first fixing parts 10 for fixing resilient sheets, and two of the first fixing parts 10 as a group. The two end-fixing parts 41 of each of the two Y-direction resilient sheets 5 are respectively fixed on the two first fixing parts 10 of the same group.

In an embodiment, the first fixing part 10 has a first vertical positioning surface and first transverse pins arranged on the first vertical positioning surface. The end-fixing part 41 is disposed with first positioning pin holes, the end-fixing part 41 fits on the first vertical positioning surface, and the first transverse pins are inserted into the first positioning pin holes respectively.

A number of the first transverse pins and the first positioning pin holes can be matched with each other according to the actual fixed strength, such as 1-3.

In an embodiment, as shown in FIG. 1, four corners of the optical anti-shake frame 2 are respectively provided with second fixing parts 20 for fixing resilient sheets, and two of the second fixing parts 20 as a group. The two end-fixing parts 41 of each of the two X-direction resilient sheets 4 are respectively fixed on the two second fixing parts 20 of the same group.

Similarly, the structure of the second fixing part 20 is the same or similar to that of the first fixing part 10, and this embodiment will not be further described.

Figure 4:
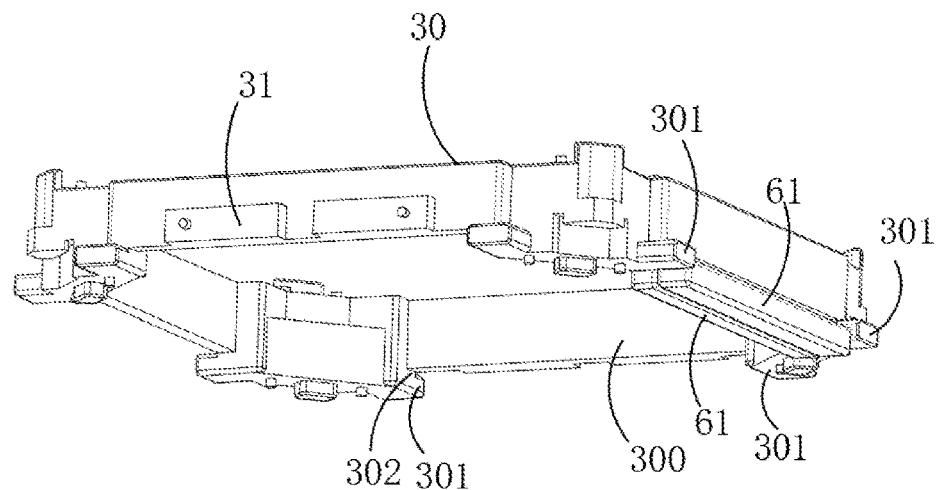
FIG. 4 is a schematic structural diagram of an outer frame provided by the disclosure.

In an embodiment, as shown in FIG. 1 and FIG. 4, middles of two opposite sides in circumferential four outer sides of an outer frame 30 of the focusing motor assembly 3 are respectively connected to two third fixing parts 31 for fixing resilient sheets, middles of two opposite sides of the optical anti-shake frame 2 are respectively connected to two fourth fixing parts 22, and the two third fixing parts 31 and the two fourth fixing parts 22 are respectively distributed at four ends of a criss-cross (also referred to as +-shape).

The middle-fixing parts 40 of the two X-direction resilient sheets 4 are respectively fixed on the third fixing part 31, and the middle-fixing parts 40 of the two Y-direction resilient sheets 5 are respectively fixed on the fourth fixing part 22.

Similarly, the structures of the third fixing part 31 and the fourth fixing part 22 are the same or similar to those of the first fixing part 10, and this embodiment will not be further described.

Figure 9:
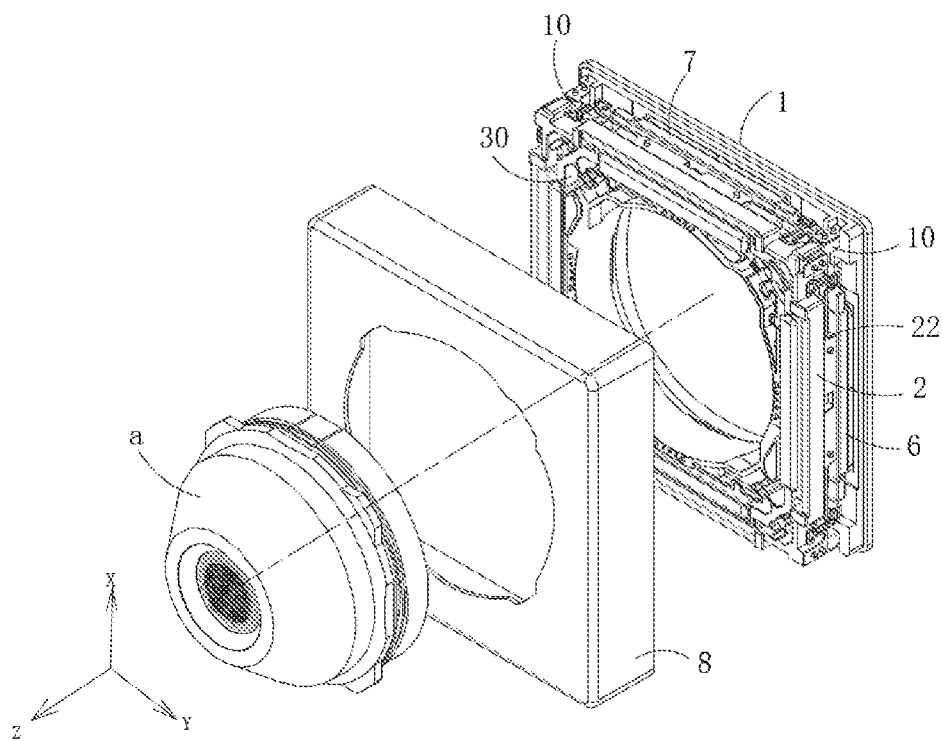
FIG. 9 is a schematic structural diagram from an exploded view of FIG. 7.
Figure 10:
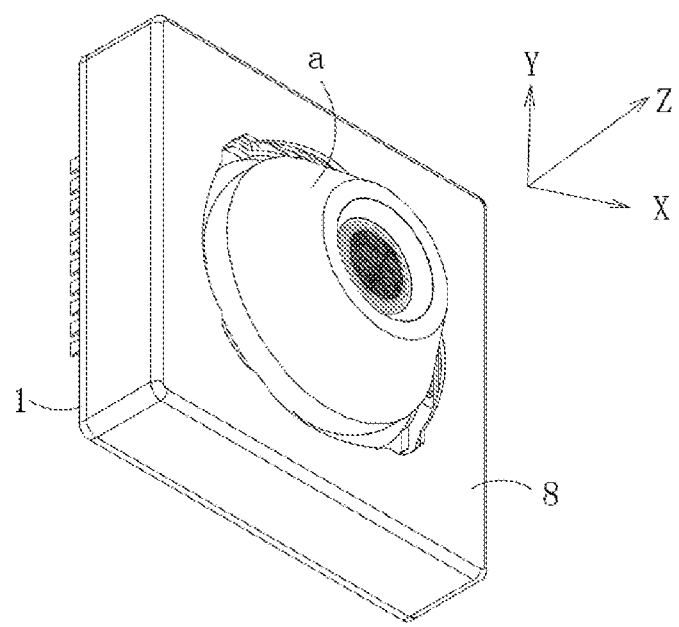
FIG. 10 is a schematic structural diagram from a stereoscopic angle of the lens driving fitting provided by the disclosure.

In an embodiment, a thickness of the fourth fixing part 22 is less than a thickness of the unilateral transverse section of the optical anti-shake frame 2, and the outer surface of the third fixing part 31 is located on the inner side below the circumferential surface of the optical anti-shake frame 2. The above design can facilitate the installation of X-direction resilient sheet 4 and Y-direction resilient sheet 5, reduce the outer diameters of the optical anti-shake frame 2 and the outer frame 30, and make the volume smaller and compact. As shown in FIGS. 8-9, because of the structure, the X-direction resilient sheet 4 and Y-direction resilient sheet 5 can be located on the lower inner side of the circumferential side of the optical anti-shake frame 2.

As shown in FIG. 1, the circumferential sides of the optical anti-shake frame 2 are respectively disposed with avoidance grooves 21 for avoiding the connecting parts 42 of the X-direction resilient sheets 4 and the connecting parts 42 of the Y-direction resilient sheets 5, and the connecting parts 42 are respectively located in the avoidance grooves 21. The above structure can improve the compactness of the overall structure, ensure the smoothness of the translation of the optical component, and avoid the failure of the translation movement of the optical component caused by blocking interference.

In an embodiment, the third fixing parts 31 are located below the lower end of the optical anti-shake frame 2, and the fourth fixing parts 22 are connected to corresponding positions of the lower end of the optical anti-shake frame 2. The inner wall of the fourth fixing parts 22 are flush with the inner wall of the optical anti-shake frame 2.

In an illustrated embodiment, as shown in FIGS. 1-4 and 9, an optical anti-shake driving device is manufactured by using the above optical anti-shake resilient support mechanism and includes: the focusing motor assembly 3 configured to support the optical component a;

the base 1, configured to support the focusing motor assembly 3;

the optical anti-shake frame 2, configured to connect the focusing motor assembly 3 and the base 1;

the optical anti-shake resilient support mechanism, configured to make the focusing motor assembly 3 suspend on the base 1; and a driving assembly.

Figure 5:
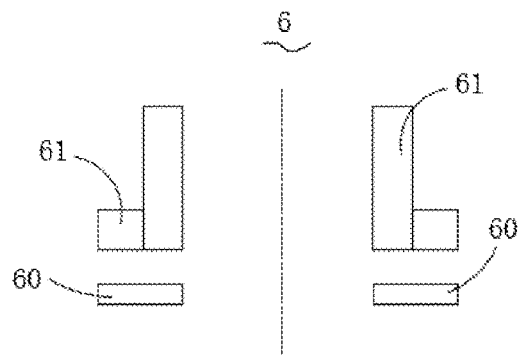
FIG. 5 is a schematic structural diagram of an X-axis driving assembly provided by the disclosure.
Figure 6:
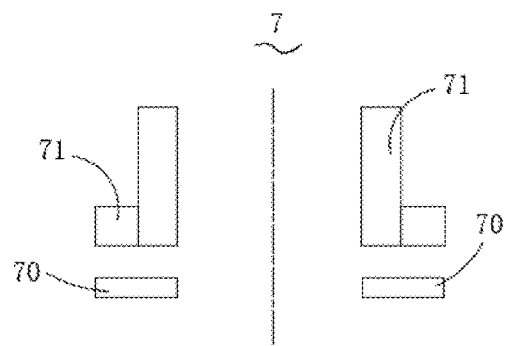
FIG. 6 is a schematic structural diagram of a Y-axis driving assembly provided by the disclosure.
Figure 7:
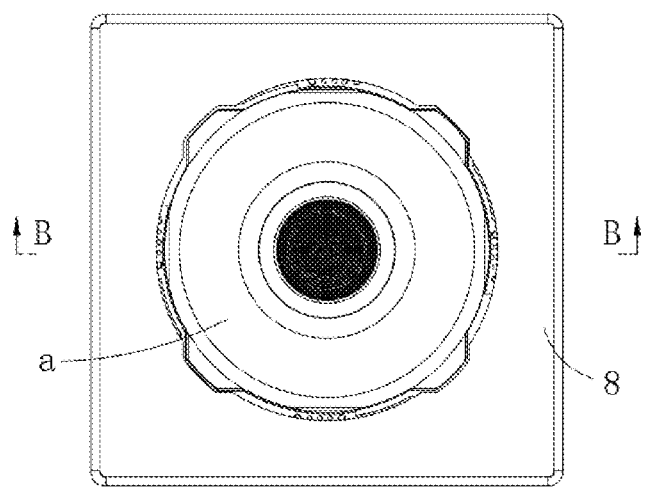
FIG. 7 is a schematic structural diagram of a lens driving fitting provided by the disclosure.

As shown in FIGS. 1 and 5-6, the driving assembly includes an X-axis driving assembly 6 and a Y-axis driving assembly 7. The X-axis driving assembly 6 is configured to drive the focusing motor assembly 3 to move along an X-axis in a horizontal plane perpendicular to an optical axis a1, and the Y-axis driving assembly 7 is configured to drive the focusing motor assembly 3 to move along a Y-axis in the horizontal plane perpendicular to the optical axis a1.

Specifically, as shown in FIGS. 4-6, the X-axis driving assembly 6 includes two X-axis driving coils 60 fixed on the base 1. Two opposite sides of a lower end of an outer frame 30 of the focusing motor assembly 3 are respectively provided with X-axis driving magnets 61 corresponding to the two X-axis driving coils 60 one by one. The X-axis driving magnets 61 of this embodiment is a double magnet, that is, the two magnets are disposed on the same horizontal plane perpendicular to the optical axis to improve the magnetic driving force.

The X-axis driving magnet 61 is located above the corresponding X-axis drive coil 60.

The Y-axis driving assembly 7 includes two Y-axis driving coils 70 fixed on the base 1. The other two opposite sides of the lower end of the outer frame 30 of the focusing motor assembly 3 are respectively provided with Y-axis driving magnets 71 corresponding to the two Y-axis driving coils 70 one by one. The Y-axis driving magnet 71 of this embodiment is a double magnet, that is, the two magnets are disposed on the same horizontal plane perpendicular to the optical axis to improve the magnetic driving force.

The Y-axis driving magnet 71 is located above the corresponding Y-axis driving coil 70.

In an embodiment, the X-axis driving magnet 61 and the Y-axis driving magnet 71 are located on the same horizontal plane perpendicular to the optical axis. This structure is convenient for processing, design and assembly and ensures the balance of the center of gravity.

In an embodiment, as shown in FIG. 4, four wall surfaces of the inner wall of the outer frame 30 are respectively disposed with magnet positioning grooves 300. For each X-axis driving magnet 61, one on the inner side of the two magnets extends into the corresponding magnet positioning groove 300. For each Y-axis driving magnet 71, one on the inner side of the two magnets extends into the corresponding magnet positioning groove 300. The two ends of each of the four outer wall surfaces of the outer wall of the outer frame 30 are respectively provided with outer convex parts 301, a magnet fixing space is formed between the two outer convex parts 301 on the same outer wall surface. Positioning groove bodies 302 are arranged on the four end surfaces at the lower end of the outer frame 30 and connected to the magnet fixing spaces. For each X-axis driving magnet 61, the other one of the two magnets is fixed in the corresponding magnet fixing space and corresponding positioning groove. For each Y-axis driving magnet 71, the other one of the two magnets is fixed in the corresponding positioning groove and the magnet fixing space, and the lower surfaces of the two Y-axis driving magnets 71 are flush.

In an embodiment, as shown in FIGS. 8-9, in order to further reduce the thickness of the device along the optical axis direction, the optical anti-shake frame 2 of the embodiment is sleeved outside the upper end of the outer frame 30 of the focusing motor assembly 3, and there is a gap is left between the optical anti-shake frame 2 and the outer frame 30. It avoids increasing the thickness of the optical anti-shake frame 2 above the outer frame 30, that is, this structure of the embodiment can be applied to a smaller installation space.

In an embodiment, a housing 8 is connected to the base 1, and the focusing motor assembly 3, the optical anti-shake frame 2 and the optical anti-shake resilient support mechanism are disposed in a chamber formed by the base 1 and the housing 8. The four corners of the outer frame 30 are respectively disposed with avoidance notches 303 for the inner protrusion opposite to the avoidance groove to avoid interference.

The working principle of this embodiment is as follows:

After the driving circuit is powered on, for example, the driving circuit sends a driving signal to the Y-axis driving assembly 7, that is, the synergy of the Y-axis driving coils 70 and the Y-axis driving magnets 71 causes the focusing motor assembly 3 loaded with the optical component a to translate on the Y-axis perpendicular to the optical axis.

Similarly, when the X-axis driving assembly 6 receives the driving signal, the synergy of the X-axis driving coils 60 and the X-axis driving magnets 61 causes the focusing motor assembly 3 loaded with the optical component a to translate on the X-axis perpendicular to the optical axis.

Embodiment 2

Figure 11:
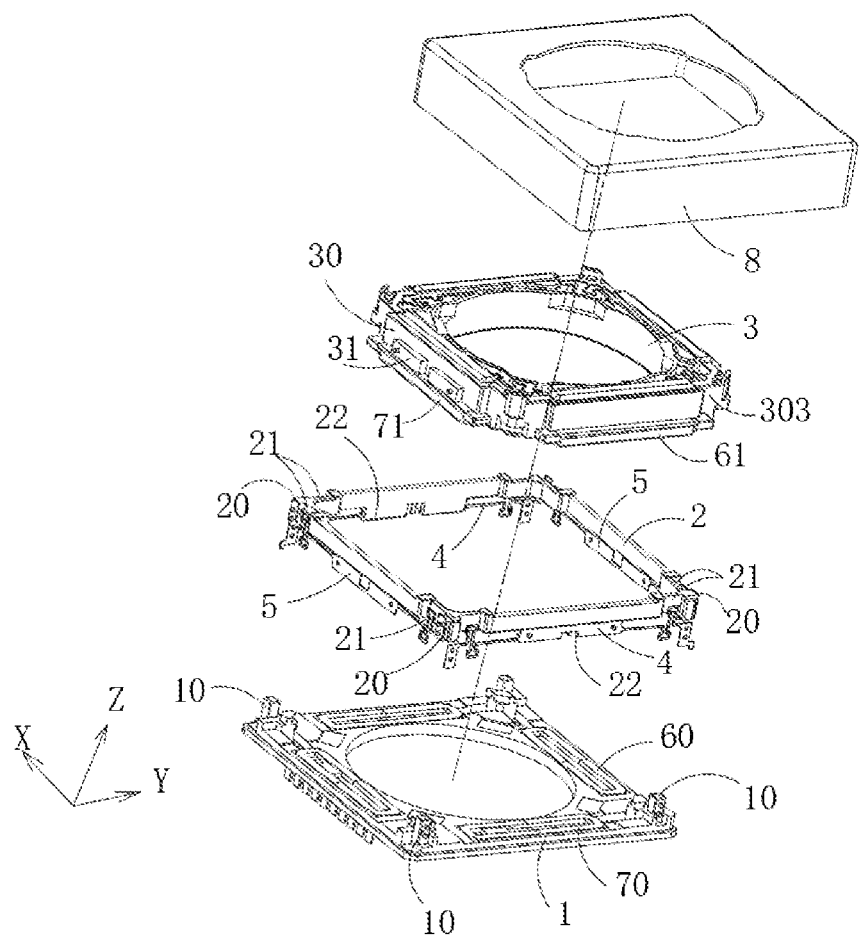
FIG. 11 is a schematic structural diagram of an optical anti-shake driving device of embodiment 2 provided by the disclosure.

As shown in FIG. 11, the structure and principle of this embodiment are basically the same as that of the embodiment 1, except that the two X-direction resilient sheets 4 are configured to connect the base 1 and the optical anti-shake frame 2, the two Y-direction resilient sheets 5 are configured to connect the focusing motor assembly 3 and the optical anti-shake frame 2. That is, when the two X-direction resilient sheets 4 are configured to connect the base 1 and the optical anti-shake frame 2, the two Y-direction resilient sheets 5 are configured to connect the focusing motor assembly 3 and the optical anti-shake frame 2.

In an embodiment, the two end-fixing parts 41 of each X-direction resilient sheet 4 are respectively fixed on the base 1, and the middle-fixing part 40 of each X-direction resilient sheet 4 is fixed on the optical anti-shake frame 2. The two end-fixing parts 41 of each Y-direction resilient sheet 5 are respectively fixed on the optical anti-shake frame 2, and the middle-fixing part 40 of each Y-direction resilient sheet 5 is fixed on the focusing motor assembly 3.

In an embodiment, middle-fixing parts 40 of the two X direction resilient sheets are respectively fixed on the fourth fixing parts 22.

The middle-fixing parts 40 of the two Y-direction resilient sheets 5 are respectively fixed on the third fixing parts 31.

Embodiment 3

Figure 12:
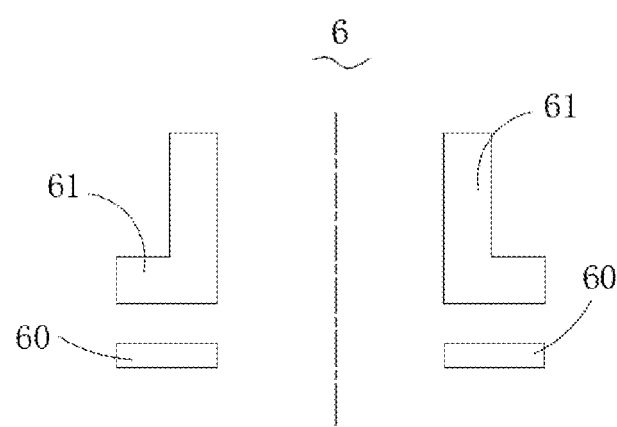
FIG. 12 is a schematic structural diagram of an X-axis driving assembly of embodiment 3 provided by the disclosure.

As shown in FIG. 12, the structure and principle of this embodiment are basically the same as that of the embodiment 1, except that the X-axis driving magnet 61 is a single magnet.

Embodiment 4

Figure 13:
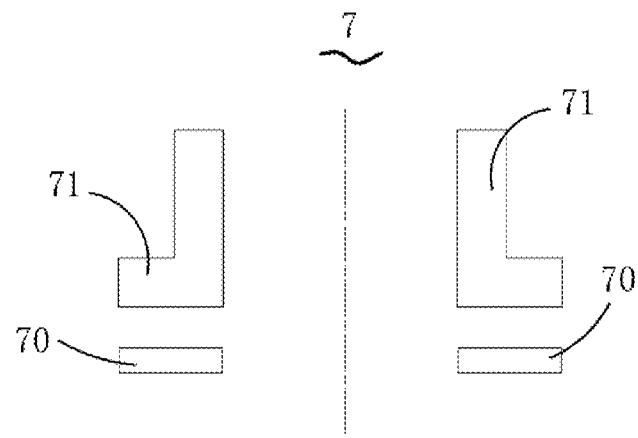
FIG. 13 is a schematic structural diagram of a Y-axis driving assembly of embodiment 4 provided by the disclosure.

As shown in FIG. 13, the structure and principle of this embodiment are basically the same as that of the embodiment 1, except that the Y-axis driving magnet 71 is a single magnet.

Embodiment 5

Based on the embodiments 1-4, as shown in FIGS. 7-10, this embodiment provides a lens driving fitting with the optical anti-shake driving device described in the embodiments 1-4. That is, it includes a focusing motor assembly 3, which is an AF motor, including an outer frame 30, a carrier, an upper resilient sheet and a lower resilient sheet. The upper resilient sheet and the lower resilient sheet work together to make the carrier disposed in the outer frame 30. At the same time, an anti-collision protrusion is arranged at the lower part of the outer frame 30 to prevent the focusing motor assembly 3 from hitting the base 1 downward. The optical component a, such as a lens, is installed on the AF motor.

Embodiment 6

Figure 14:
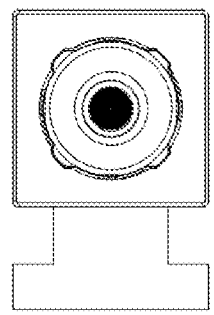
FIG. 14 is a schematic structural diagram of an imaging equipment of embodiment 6 provided by the disclosure.

Based on the embodiment 5, as shown in FIG. 14, this embodiment provides an imaging equipment with the lens driving fitting described in the embodiment 5. The imaging equipment, such as an imaging module.

Embodiment 7

Figure 15:
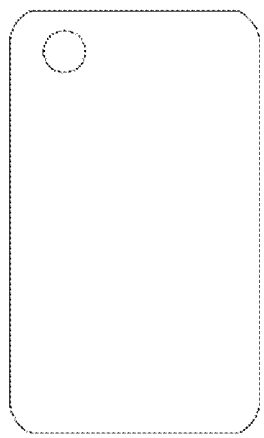
FIG. 15 is a schematic structural diagram of an electronic apparatus of embodiment 7 provided by the disclosure.

Based on the embodiment 6, as shown in FIG. 15, this embodiment provides an electronic apparatus with the imaging equipment described in the embodiment 6. The electronic apparatus such as mobile phones and so on.

The specific embodiments described herein are merely illustrative of the spirit of the disclosure. Those skilled in the technical field of the disclosure can make various modifications or supplements to the described specific embodiments or replace them in a similar way, but they will not deviate from the spirit of the disclosure or go beyond the scope defined in the appended claims.

What is claimed is:

1. An optical anti-shake driving device, comprising:
a focusing motor assembly, configured to support an optical component;
a base, configured to support the focusing motor assembly;
an optical anti-shake frame, configured to connect the focusing motor assembly and the base; and
an optical anti-shake resilient support mechanism, configured to make the focusing motor assembly suspend on the base, resiliently support on the focusing motor assembly and the base, and resiliently support on the focusing motor assembly and the optical anti-shake frame; wherein the optical anti-shake resilient support mechanism comprises:

two X-direction resilient sheets, symmetrically distributed with an optical axis of the optical component as an axis of symmetry and configured to connect the focusing motor assembly and the optical anti-shake frame or to connect the base and the optical anti-shake frame; and two Y-direction resilient sheets, symmetrically distributed with the optical axis of the optical component as an axis of symmetry and configured to connect the base and the optical anti-shake frame or to connect the focusing motor assembly and the optical anti-shake frame;

a driving assembly, comprising an X-axis driving assembly and a Y-axis driving assembly, wherein the X-axis driving assembly is configured to drive the focusing motor assembly to translate unidirectionally along an X-axis in a horizontal plane perpendicular to the optical axis; and the Y-axis driving assembly is configured to drive the focusing motor assembly to translate unidirectionally along a Y-axis in the horizontal plane perpendicular to the optical axis;

wherein the X-axis driving assembly comprises two X-axis driving coils fixed on the base, and two opposite sides at a lower end of an outer frame of the focusing motor assembly are respectively disposed with X-axis driving magnets corresponding to the two X-axis driving coils one by one;

wherein the Y-axis driving assembly comprises two Y-axis driving coils fixed on the base, and the other two opposite sides at the lower end of the outer frame of the focusing motor assembly are respectively disposed with Y-axis driving magnets corresponding to the two Y-axis driving coils one by one; and wherein each of the X-axis driving magnets is one of a single magnet and a double magnet, and each of the Y-axis driving magnets is one of a single magnet and a double magnet.

2. The optical anti-shake driving device according to claim 1, wherein the optical anti-shake frame is sleeved outside an upper end of the outer frame of the focusing motor assembly, and a gap is formed between the optical anti-shake frame and the outer frame.

3. A lens driving fitting, comprising the optical anti-shake driving device according to claim 1.

4. The optical anti-shake driving device according to claim 1, wherein a structure of each of the two X-direction resilient sheets is the same as that of each of the two Y-direction resilient sheets, and the structure comprises a middle-fixing part, two end-fixing parts, and two connecting parts; and wherein two ends of the middle-fixing part are respectively connected to the two connecting parts, an end of each of the two connecting parts far away from the middle-fixing part is connected to one of the two end-fixing parts.

5. The optical anti-shake driving device according to claim 4, wherein the two end-fixing parts of each of the two X-direction resilient sheets are fixed on the optical anti-shake frame, and the middle-fixing part of each of the two X-direction resilient sheets is fixed on the focusing motor assembly; the two end-fixing parts of each of the two Y-direction resilient sheets are fixed on the base, and the middle-fixing part of each of the two Y-direction resilient sheets is fixed on the optical anti-shake frame.

6. The optical anti-shake driving device according to claim 4, wherein the two end-fixing parts of each of the two X-direction resilient sheets are fixed on the base, and the middle-fixing part of each of the two X-direction resilient sheets is fixed on the optical anti-shake frame; the two end-fixing parts of each of the two Y-direction resilient sheets are respectively fixed on the optical anti-shake frame, and the middle-fixing part of each of the two Y-direction resilient sheets is fixed on the focusing motor assembly.

7. The optical anti-shake driving device according to claim 4, wherein four corners of the base are respectively disposed with first fixing parts, and two of the first fixing parts as a group; and wherein the two end-fixing parts of each of the two X-direction resilient sheets are respectively fixed on the two first fixing parts of a same group; or the two end-fixing parts of each of the two Y-direction resilient sheets are respectively fixed on the two first fixing parts of a same group.

8. The optical anti-shake driving device according to claim 7, wherein four corners of the optical anti-shake frame are respectively disposed with second fixing parts, and two of the second fixing parts as a group;

wherein the two end-fixing parts of each of the two X-direction resilient sheets are respectively fixed on the two second fixing parts of a same group; or the two end-fixing parts of each of the two Y-direction resilient sheets are respectively fixed on the two second fixing parts of a same group.

9. The optical anti-shake driving device according to claim 8, wherein middles of two opposite sides of the outer frame of the focusing motor assembly are respectively connected to two third fixing parts, and middles of two opposite sides of the optical anti-shake frame are respectively connected to two fourth fixing parts, the two third fixing parts and the two fourth fixing parts are respectively distributed on four ends of a criss-cross;

wherein the middle-fixing parts of the two X-direction resilient sheets are respectively fixed on the two third fixing parts and the middle-fixing parts of the two Y-direction resilient sheets are respectively fixed on the two fourth fixing parts; or the middle-fixing parts of the two X-direction resilient sheets are respectively fixed on the two fourth fixing parts and the middle-fixing parts of the two Y-direction resilient sheets are respectively fixed on the two third fixing parts.

10. The optical anti-shake driving device according to claim 4, wherein the two X-direction resilient sheets and the two Y-direction resilient sheets are respectively located at lower inner sides of circumferential sides of the optical anti-shake frame, the circumferential sides of the optical anti-shake frame are respectively disposed with avoidance grooves for avoiding the connecting parts of the two X-direction resilient sheets and the connecting parts of the two Y-direction resilient sheets, and the connecting parts of the two X-direction resilient sheets and the two Y-direction resilient sheets are respectively located in the avoidance grooves.

\* \* \* \* \*